Oct. 18, 1932.  J. F. CULLIN  1,882,779
ELECTRICAL APPARATUS
Filed May 31, 1929    2 Sheets-Sheet 1
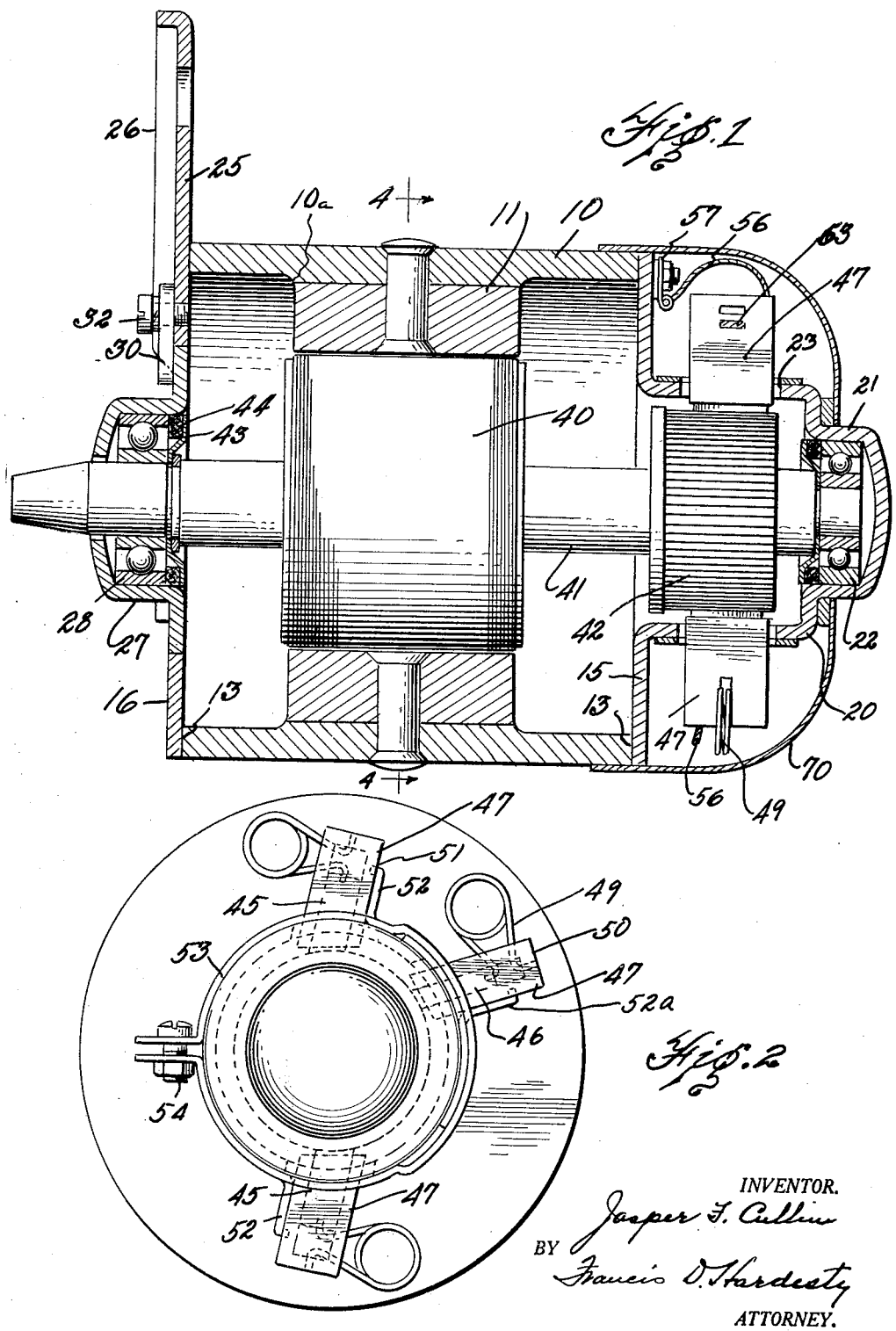
INVENTOR.
Jasper F. Cullin
BY Francis O. Hardesty
ATTORNEY.

Oct. 18, 1932.  J. F. CULLIN  1,882,779
ELECTRICAL APPARATUS
Filed May 31, 1929   2 Sheets-Sheet 2
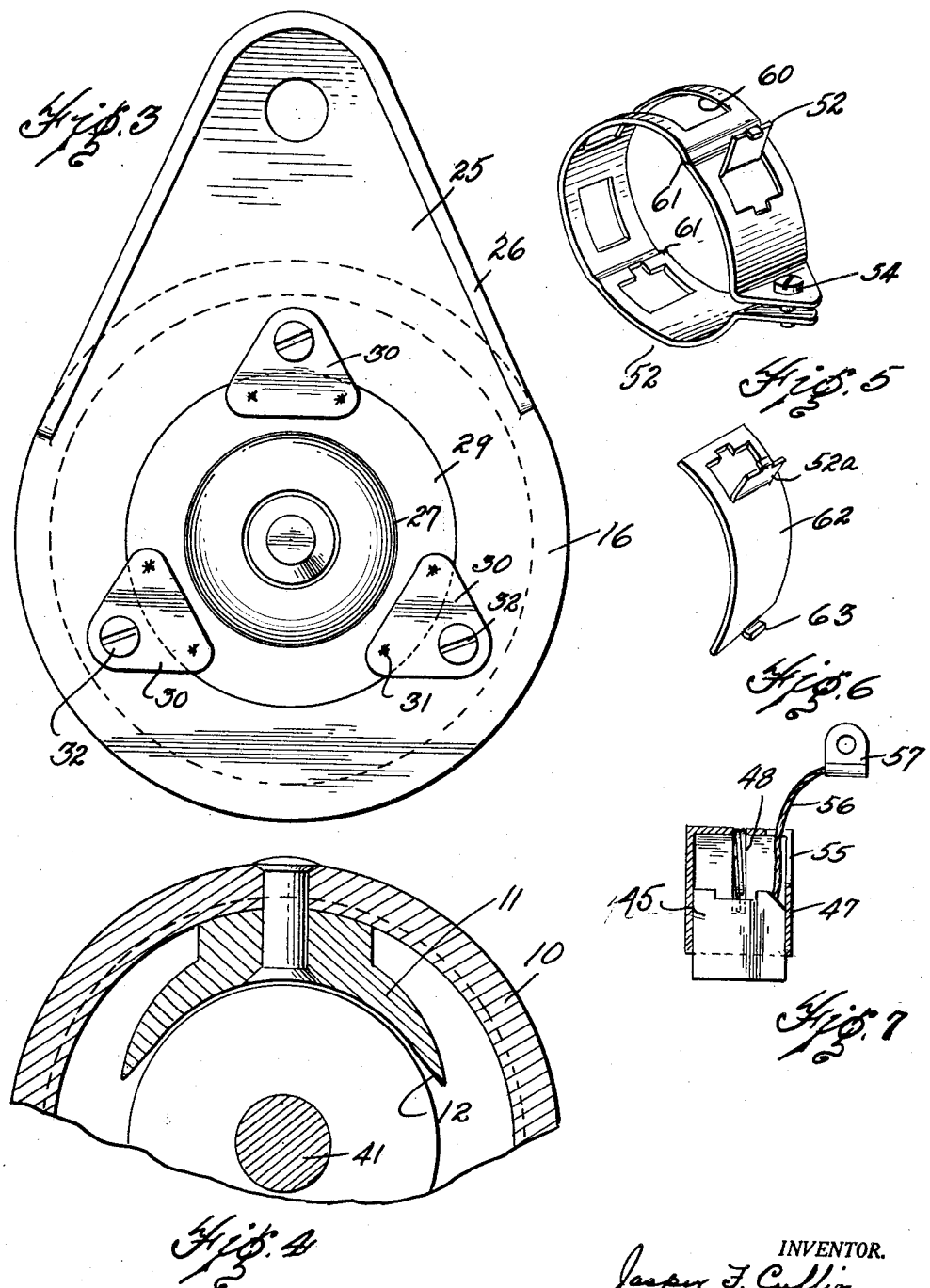
INVENTOR.
Jasper F. Cullin
BY
Francis O. Hardesty
ATTORNEY.

Patented Oct. 18, 1932

1,882,779

UNITED STATES PATENT OFFICE

JASPER F. CULLIN, OF DETROIT, MICHIGAN, ASSIGNOR, BY MESNE ASSIGNMENTS, TO DELCO-REMY CORPORATION, OF ANDERSON, INDIANA, A CORPORATION OF DELAWARE

ELECTRICAL APPARATUS

Application filed May 31, 1929. Serial No. 367,338.

The present invention relates to electrical apparatus and more particularly to electric generators, especially for use on motor vehicles.

Among the objects of the invention is to greatly lessen the cost of manufacture of such devices without at the same time lessening their efficiency or accuracy of construction.

Another object is a device of the kind indicated in which the brush construction, mounting and adjustment is greatly simplified.

Another object is a brush mounting in which the brush holders and adjusting means are entirely outside of the housing and therefore more accessible than in the conventional form of device.

Still other objects will readily occur to those skilled in the art upon reference to the following description and the accompanying drawings in which Fig. 1 is a longitudinal section through a generator embodying the present invention.

Fig. 2 is an end view thereof with the brush cover removed.

Fig. 3 is an end view from the left of Fig. 1.

Fig. 4 is a section on line 4—4 of Fig. 1.

Figs. 5 and 6 are details, in perspective, of the brush carrying ring, and

Fig. 7 is a section through one of the brush-holders.

As indicated in the drawings, the device comprises a tubular field element and housing 10 having mounted therein the arcuate field elements or pole pieces 11. In forming the element 10 it is preferred to provide a strip of metal approximately as wide as the length of the member 10 and having the ridge 10a rolled therein. A suitable length of this strip is then cut and rolled up to tube form and its ends welded. This tube so formed is then machined along the top of the ridge 10a to provide a comparatively smooth inner surface and the pole pieces 11 put in place as indicated in Fig. 1. These may be riveted as shown, or fastened permanently in position in any suitable manner. After the pole pieces have been fastened in place, they are then accurately machined or bored to provide the necessary curved inner surface. When this has been done, the ends 13 of the member 10 are fashioned off in planes accurately perpendicular to the axis of the pole bore. This is readily accomplished by inserting in the pole bore a suitable arbor which is sized to fit closely in the said bore. After the pole bore and the ends of member 10 have been thus accurately co-related, a second arbor having end pieces that correspond to the bearing members 22 and 28 is used to locate the cover plates hereinafter described.

The end pieces 15 and 16 are then provided, these being sheet metal members of which the member 15 consists of a disc portion having at its center a cup-shaped portion 20, which itself has a reduced portion 21 forming a seat for the ball bearing 22. The seat in portion 21 is accurately surfaced to receive the outer race of the ball bearing and the portion 20 is provided with a plurality of openings 23 to receive the brushes as hereinafter described.

The cover member 16 consists of a disc portion having at one side an extension 25 which is preferably flanged along its edges as indicated at 26. This element 16 has the center portion of its disc first formed to provide a cup portion 21 acting as a seat for the ball bearing 28 and is then punched out to provide a removable portion 29 carrying the cup 27.

It is preferred to merely cut the portion 29 from the main disc without removal therefrom until after a plurality of small plates 30 have been welded thereto as indicated at 31. These small plates 30 are provided with suitable openings for screws 32 by means of which the portion 29 may be secured to the disc 16.

When the ends 15 and 16 have been prepared, a suitable arbor is placed in the member 10 between the pole pieces 11, being formed to fit accurately therein and being provided with extensions accurately concentric with the body portion, which extensions correspond with the bearings 22 and 28. With the arbor in place, the members 15 and 16 are then placed in position and are accurately located by means of the arbor. The plates 15 and 16 are then welded or otherwise secured to the member 10 and the arbor withdrawn through the opening provided by the removal of the portion 29 of the disc 16. The side of this portion 29 is preferably slightly greater than the space embraced by the pole pieces 11. When the end members have been placed in position, the armature 40 carried on a suitable shaft 41 and carrying the commutator 42 together with the bearings 22 and 28 may be placed in position through the openings just mentioned. It is, of course, obvious that the size of the armature should be such that it has the proper clearance from the pole pieces 11. A suitable washer 43 and packing 44 may be provided in connection with the bearings 22 and 28 to permit lubrication of the latter without escape of lubricant into the interior of the generator.

As mentioned above, the plate 15, in the cup portion 20, is provided with several openings through which extend the brushes and brushholders shown more particularly in Fig. 2, while the brush rigging is carried on the outside thereof. These brushes comprise the usual blocks of suitable composition material indicated at 45, there being a third brush 46 shown. The blocks of brush material are enclosed in suitable cup shaped holders 47 of which the two of them are of insulating material while the third may be of metal, being grounded. These holders 47 are closed at their rear ends and are provided with an opening 48 in one side for the reception of the ends of spring 49. These spring ends extend through the opening and one end cooperates with the rear wall 50 of the holder while the other end cooperates with the back end of the brush block, the spring being formed to exert a pressure on the back of the brush to hold the latter against the commutator. The outside of the brush holder 47 is provided with a slot 51 in which is received the hooked end of the tongues 52. Two of these tongues are formed on a strap element 53 which embraces the cup portion 20 and may be fixed against movement by means of a bolt 54 drawing together its ends opposite the opening for the third brush 46. The strap 53 is also provided with a portion of somewhat larger diameter than the remainder as indicated by the shoulder 61 and in this larger portion is provided with a slot 60. In this portion is placed a movable section 62 which is provided with a tongue member 52ª extending through slot 60 and adapted to hold the third brush 46 and its holder 47 in the same manner as provided for the other two brushes. This member 62 is of such length that it may be moved circumferentially under the strap in order to adjust the position of the third brush and holder.

At one end of its movement, the brush holder will act as a stop and at the other end of its movement a tongue 63 adapted to abut the end of the slot 60 is provided to act as a stop.

Besides the slots, etc., just mentioned in connection with the brush holders, they will also be provided with openings 55 through which extend the pigtails 56 providing for current leads from the brushes to the binding posts or other connection as indicated at 57.

After the brushholders and brushes have been placed in position and fastened by means of a bolt 54, a cover member 70 is preferably placed over the end of the assembly to protect the same against dirt and damage.

By means of the extension 25 on the cover plate 16 the generator is secured to its proper support in the conventional manner.

It will be noted that the above construction permits the production of the device by relating all of the operations to the air gap which it is proposed to use in the device. The first accurate operation consists in boring accurately the facing of the pole pieces to determine the location and position of such faces. After these have been accurately finished, the facing of the ends of the housing is done with relation to the pole bore. After the facing has been accomplished, the location of the end plates and the shaft bearings is done with these parts related to the pole bore as well.

This method of production is directly opposite to the usual method in which the air gap is the last element to be located. In the usual construction there must be a series of accurate operations and these must be accurate within the very narrow limits in order that the air gap may be properly concentric and of proper width. In the present method the air gap is the starting point and there are only one or two operations which need to be of any great accuracy.

Now, having described the invention and the preferred forms of embodiment thereof, it is to be understood that the said invention is to be limited, not to the specific details herein described and illustrated, but only by the scope of the claims which follow.

I claim:—

1. The method of forming electrical apparatus which includes the steps of permanently mounting pole pieces on the inside of a cylindrical housing, machining the pole pieces so mounted so as to provide curved surfaces all of which are in the same cylindrical imaginary surface, machining and surfacing the ends of the cylindrical housing to proper dimensions using the curved surfaces of the pole pieces as datum surfaces the steps being performed in the order above enumerated.

2. The method of forming electrical apparatus which includes the steps of permanently mounting pole pieces on the inside of a cylindrical housing, machining the pole pieces so mounted so as to provide curved surfaces all of which are in the same cylindrical imaginary surface, machining and surfacing the ends of the cylindrical housing to proper dimension using the curved surfaces of the pole pieces as datum surfaces, and mounting on the ends of said housing end plates provided with armature or shaft bearings the steps being performed in the order above enumerated.

JASPER F. CULLIN.